United States Patent
Takahara et al.

(10) Patent No.: US 6,960,252 B2
(45) Date of Patent: Nov. 1, 2005

(54) YELLOW PIGMENT COMPOSITION FOR IMAGE RECORDING AND PROCESS FOR PRODUCING THE SAME

(75) Inventors: Koichi Takahara, Hyogo (JP); Kensuke Misono, Hyogo (JP); Hidehiro Tamatome, Hyogo (JP); Junichiro Sato, Hyogo (JP); Kunji Kitamura, Hyoko (JP)

(73) Assignee: Sanyo Color Works, Ltd., Hyogo (JP)

( * ) Notice: Subject to any disclaimer, the term of this patent is extended or adjusted under 35 U.S.C. 154(b) by 48 days.

(21) Appl. No.: 10/721,402

(22) Filed: Nov. 25, 2003

(65) Prior Publication Data

US 2004/0138434 A1 Jul. 15, 2004

(30) Foreign Application Priority Data

Nov. 27, 2002 (JP) ....................... 2002-344030
Dec. 13, 2002 (JP) ....................... 2002-362517
Oct. 27, 2003 (JP) ....................... 2003-366182

(51) Int. Cl.$^7$ ............................. C09B 67/00
(52) U.S. Cl. ................. 106/496; 106/493; 106/494; 106/498
(58) Field of Search .................. 106/493, 494, 106/496, 498; 534/578, 579, 588

(56) References Cited

U.S. PATENT DOCUMENTS 3,759,733 A  9/1973 Price et al.

FOREIGN PATENT DOCUMENTS

JP  07 126546 A  5/1995

OTHER PUBLICATIONS

European Search Report dated Mar. 4, 2004 from The Hague for European Application No. EP 03 25 7476.

Primary Examiner—Anthony J. Green
(74) Attorney, Agent, or Firm—Marshall, Gerstein & Borun LLP

(57) ABSTRACT

Monoazo based yellow pigment compositions for image recording that are suitable as a well-balanced yellow coloring agent for image recording with favorable reproducibility of images and image retaining capacity, which is inexpensive and excellent in safety are provided. Provided is a yellow pigment composition for image recording which includes a monoazo yellow base pigment represented by the general formula (1):

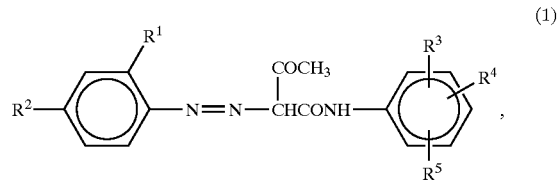

and a particular disazo yellow pigment having a sulfonic acid group and/or a particular monoazo yellow pigment.

8 Claims, No Drawings

YELLOW PIGMENT COMPOSITION FOR IMAGE RECORDING AND PROCESS FOR PRODUCING THE SAME

BACKGROUND OF THE INVENTION

1. Field of the Invention

The present invention relates to yellow pigment compositions for image recording, and processes for producing the same. More particularly, the present invention relates to yellow pigment compositions for image recording for use in color image formation in electronic photographs, electrostatic printing processes, ink jet systems and the like, and processes for producing the same.

2. Description of the Related Art

In color image formation in electronic photographs, electrostatic printing processes, ink jet systems and the like, the following characteristics, i.e., optical characteristics such as hue, transparency, tinctorial strength and the like, as well as durability such as light resistance, heat resistance, solvent resistance and the like are required in order to achieve reproducibility of color imaging which exhibits favorable quality. In addition, also characteristics involving absence of problems in connection with mutagenicity which results from the coloring agent, safety of decomposed products and the like are concomitantly required. Hence, it is preferred that the coloring agent for use is a pigment rather than a dye in general, in light of durability. Examples of the yellow pigment which has been used include e.g., benzidine based disazo pigments such as C. I. Pigment Yellow 12, 13, 17 and 83; condensed azo pigments such as C. I. Pigment Yellow 93, 95, 128, 151, 154, 155 and 180.

However, the benzidine based disazo pigments are preferable in respect of reproducibility of a color image which is predominantly affected by optical characteristics such as hue, transparency, tinctorial strength and the like, but is not preferable in respect of image retaining capacity which is predominantly affected by light resistance. Further, safety thereof is also in question due to decomposition products resulting from the benzidines. On the other hand, condensed azo pigments are satisfactory in retaining capacity of images and safety in comparison with benzidine based disazo pigments, however, they have drawbacks such as high cost, insufficient reproducibility of a color image and the like, with additional problems of dispersibility. Hence, they have good and bad points, respectively, under the present circumstances.

As a process for improving dispersibility of an azo pigment, for example, use of an azo based dispersion has been proposed (Patent Document 1:JP-A No. 7-126546). However, this azo based dispersion is effective in instances where the particle size of the pigment in paints, inks and the like is 1 to 20 μm, but the dispersing effect is not sufficient in color image formation in electronic photographs, electrostatic printing processes, ink jet systems and the like, because pigments for use therein have a further smaller particle size.

SUMMARY OF THE INVENTION

An object of the present invention is to provide monoazo based yellow pigment compositions for image recording which are suitable as a well-balanced yellow pigment coloring agent for image recording with favorable reproducibility of images and image retaining capacity, which is inexpensive and excellent in safety for a process of color image formation in electronic photographs, electrostatic printing processes, ink jet systems and the like.

The yellow pigment composition for image recording of the present invention comprises a monoazo yellow base pigment represented by the following general formula (1), and a disazo yellow pigment represented by the following general formula (2) and/or a monoazo yellow pigment represented by the following general formula (3):

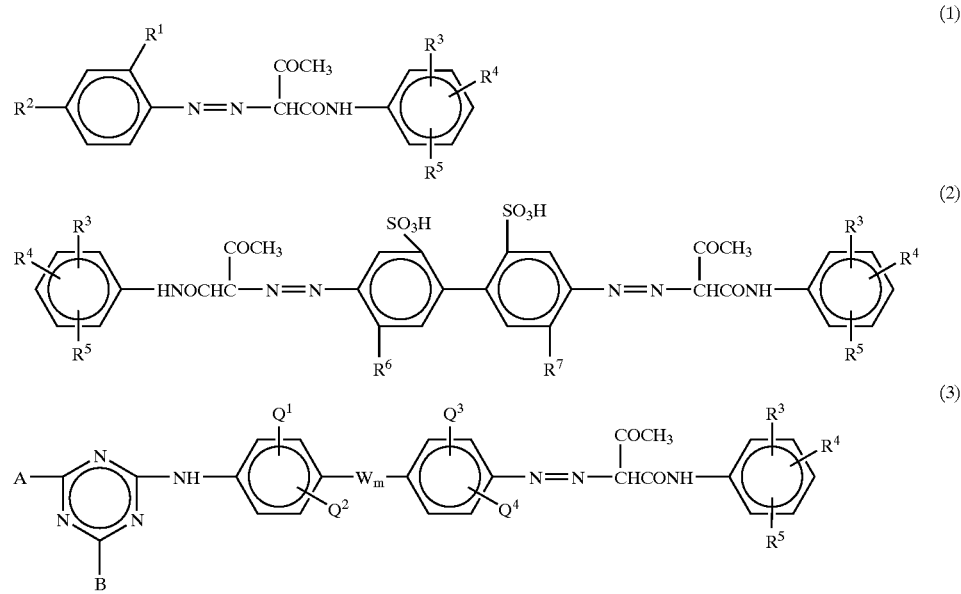

is predominantly affected by optical characteristics such as hue, transparency, tinctorial strength and the like, but is not preferable in respect of image retaining capacity which is predominantly affected by light resistance. Further, safety thereof is also in question due to decomposition products in the formulae (1) to (3), $R^1$ and $R^2$ represent a hydrogen atom, a chlorine atom, a nitro group, a methyl group or a methoxy group which are different with each other, $R^3$, $R^4$ and $R^5$ represent a hydrogen atom, a chlorine atom, a methyl group, a methoxy group or an ethoxy group which may be the same or different, $R^6$ and $R^7$ represent a methyl group or a methoxy group, $Q^1$ to $Q^4$ each independently represent a hydrogen atom, a lower alkyl group or a lower alkoxy group having 1 to 2 carbon atoms, or a hydroxyl group, W is a substituent selected from the groups represented by the following formulae:

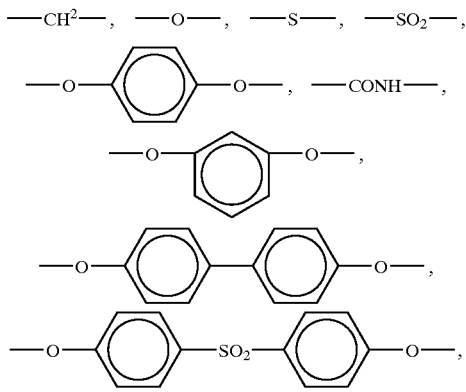

m represents an integer of 0 or 1, A and B each independently represent either one of a group represented by —NH—Y—SO$_3$H or a —OH group, wherein Y is a group selected from an ethylene group, a phenylene group and a naphthylene group, which may include a substituent.

It is preferred that content of the aforementioned monoazo yellow base pigment represented by the general formula (1) is 98 to 80 mol %; and total content of the aforementioned disazo yellow pigment represented by the general formula (2) and/or the aforementioned monoazo yellow pigment represented by the general formula (3) is 2 to 20 mol %.

Moreover, it is preferred that every one of: primary particle diameter of the aforementioned monoazo yellow base pigment represented by the general formula (1), primary particle diameter of the aforementioned disazo yellow pigment represented by the general formula (2), and primary particle diameter of the aforementioned monoazo yellow pigment represented by the general formula (3) is in the range of from 0.15 to 0.2 µm.

The process for producing a yellow pigment composition for image recording of the present invention which comprises subjecting: a diazonium salt composed of a base of the general formula (1) represented by the general formula (4), and a base of the aforementioned disazo yellow pigment of the general formula (2) represented by the general formula (5) and/or a base of the aforementioned monoazo yellow pigment of the general formula (3) represented by the general formula (6); and a coupling agent of the general formula (1), and the general formula (2) and/or the general formula (3), which is represented by the general formula (7) to a coupling reaction:

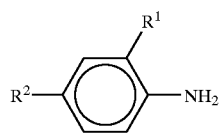
(4)

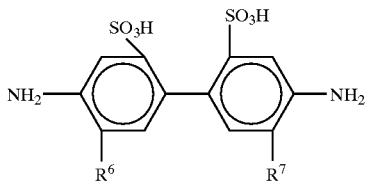
(5)

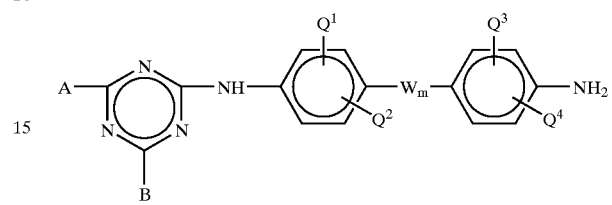
(6)

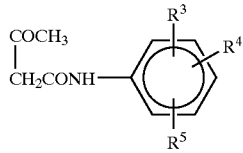
(7)

in the formulae (4) to (6), $R^1$ and $R^2$ represent a hydrogen atom, a chlorine atom, a nitro group, a methyl group or a methoxy group which are different with each other, $R^3$, $R^4$ and $R^5$ represent a hydrogen atom, a chlorine atom, a methyl group, a methoxy group or an ethoxy group which may be the same or different, $R^6$ and $R^7$ represent a methyl group or a methoxy group, $Q^1$ to $Q^4$ each independently represent a hydrogen atom, a lower alkyl group or a lower alkoxy group having 1 to 2 carbon atoms, or a hydroxyl group, W is a substituent selected from the groups represented by the following formulae:

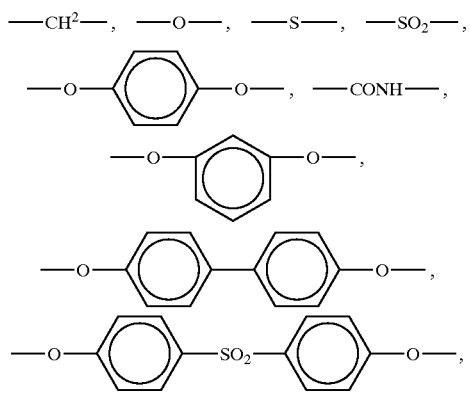

m represents an integer of 0 or 1, A and B each independently represent either one of a group represented by —NH—Y—SO$_3$H or a —OH group, wherein Y is a group selected from an ethylene group, a phenylene group and a naphthylene group, which may include a substituent.

In the process as described above, the aforementioned monoazo yellow base pigment represented by the general formula (1), and the aforementioned disazo yellow pigment represented by the general formula (2) and/or the aforementioned monoazo yellow pigment represented by the general formula (3) which are synthesized separately from the above-described monoazo yellow base pigment may be blended.

Additionally, in the process as described above, a diazonium salt composed of a base of the general formula (1)

represented by the general formula (4) in an amount of 98 to 80 mol %, and a base of the aforementioned disazo yellow pigment of the general formula (2) represented by the general formula (5) and/or a base of the aforementioned monoazo yellow pigment of the general formula (3) represented by the general formula (6) in an amount of 2 to 20 mol %; and a coupling agent of the general formula (1), and the general formula (2) and/or the general formula (3), which is represented by the general formula (7) may be subjected to a coupling reaction.

Moreover, in the process as described above, it is preferred that 98 to 80 mol % of the aforementioned monoazo yellow base pigment represented by the general formula (1), and 2 to 20 mol % of the aforementioned disazo yellow pigment represented by the general formula (2) and/or the aforementioned monoazo yellow pigment represented by the general formula (3) which are synthesized separately from the above-described monoazo yellow base pigment are blended.

DESCRIPTION OF THE PREFERRED EMBODIMENTS

The present invention is explained in more detail below.

In order to use a monoazo yellow base pigment as a coloring agent for image recording, improvement of stability of crystals against the solvent, heat and the like is required in addition to further improvement of optical characteristics, while keeping the original characteristics of these monoazo base pigments. In order to solve this problem, growing of crystals in the procedure of producing a coloring composition for image recording which comprises a monoazo yellow pigment can be prevented by incorporating a monoazo yellow base pigment represented by the general formula (1), and a disazo yellow pigment represented by a particular general formula (2) containing a sulfonic acid group having a different structure from that of this monoazo yellow base pigment and/or a monoazo yellow pigment represented by the following general formula (3) to allow for the coexistence thereof.

Ratio of the monoazo yellow pigment represented by the general formula (1) to be blended is preferably 98 to 80 mol %, and ratio of the disazo yellow pigment represented by the following general formula (2) and/or the monoazo yellow pigment represented by the general formula (3) is preferably 2 to 20 mol %. Furthermore, by setting the primary particle diameter of these yellow base pigment and yellow pigments to be a small value, i.e., 0.15 to 0.2 μm or less, growing of the crystals in the procedure of producing a coloring composition for image recording which comprises a monoazo yellow pigment can be prevented.

Introduction of the yellow pigment(s) represented by a particular general formula (2) containing a sulfonic acid group and/or the general formula (3) into the monoazo yellow base pigment represented by the general formula (1) can be conducted during the synthesis by a coupling reaction, or conducted by mixing and blending in the form of paste or powder of the pigments which had been separately synthesized. When the introduction is executed during the synthesis, diazonium salts may be concurrently or separately produced using the base represented by the general formula (4) (preferably, 98 to 80 mol %), and the base represented by the general formula (5) and/or the general formula (6) (preferably 2 to 20 mol %), and thereafter they may be subjected to a coupling reaction with the coupling agent represented by the general formula (7). Alternatively, when the introduction is executed by mixing and blending of the pigments which had been separately synthesized, the pigments may be synthesized by coupling reactions conducted separately using the pigments represented by the general formula (1), the general formula (2) and/or the general formula (3), and thereafter, they may be mixed and blended to be preferably 2 to 20 mol %. In this instance, the pigment of the present invention may be perfected by adding and mixing a predetermined amount of the pigment paste of the general formula (2) and/or the general formula (3) after the synthesis by a coupling reaction of the pigment represented by the general formula (1), or may be perfected by blending a predetermined amount of each pigment in the form of powder.

Examples of the base represented by the general formula (4) include 2-nitro-4-methyl-aniline, p-chloro-o-nitroaniline, p-nitroaniline, o-nitroaniline, p-methoxy-o-nitroaniline, 4-nitro-2-methoxyaniline and the like.

Examples of the base represented by the general formula (5) include 3,3'-dimethyl -4,4'-diaminobiphenyl-6,6'-disulfonic acid, 3,3'-dimethoxy-4,4'-diaminobiphenyl-6,6'-disulfonic acid and the like.

The base represented by the general formula (6) has A and B each independently representing either one of the group represented by —NH—Y—SO$_3$H or a —OH group, wherein Y represents a group selected from an ethylene group, a phenylene group and a naphthylene group, which may include a substituent. Typical examples of —NH—Y—SO$_3$H which may be used include taurine, sulfanilic acid, metanilic acid, ortanilic acid, naphthionic acid, tobias acid, 2-aminophenol-4-sulfonic acid, 2-methoxy aniline-5-sulfonic acid, 4-chloroaniline-3-sulfonic acid, 2-nitroaniline-3-sulfonic acid, 2-nitroaniline-4-sulfonic acid, 4B acid (p-toluidine-m-sulfonic acid), 2B acid (o-chloro-p-toluidine-m-sulfonic acid), C acid (3-amino-6-chlorotoluene-4-sulfonic acid), CB acid (3-amino-6-chlorobenzoic acid-4-sulfonic acid), γ acid (2-amino-8-naphthol-6-sulfonic acid) and the like.

Typical examples of the process for preparing thee base represented by the general formula (6) include the following two processes represented by (1) and (2), and summaries thereof are given below.

(1) First, 1.0 mol of diamine represented by the general formula (8):

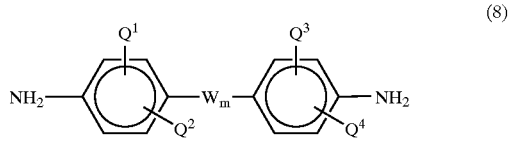

and 1.0 mol of cyanuric chloride may be subjected to a reaction, and the reaction product may be then subjected to a reaction with 1.0 to 2.0 mol of a compound represented by —NH—Y—SO$_3$H such as taurine or the like.

(2) First, 1.0 mol of cyanuric chloride and 1.0 to 2.0 mol of a compound represented by —NH—Y—SO$_3$H such as taurine or the like may be subjected to a reaction, followed by the reaction with 1.0 mol of diamine represented by the general formula (8). However, any of a variety of processes for preparation can be employed in addition to the processes represented by (1) and (2).

Illustrative examples of the coupling agent represented by the general formula (7) include acetoacetylanilide, acetoacetyl-o-chloro-anilide, acetoacetyl-o-anisidide, acetoacetyl-p-anisidide, acetoacetyl-o-toluidide, acetoacetyl-m-xylidide, 2,5-dimethoxy -4-chloroacetoacetylanilide, 2,5-dimethyl-acetoacetylanilide, acetoacetyl-p-phenetidide and the like.

In order to obtain the yellow pigment composition for image recording which is intended by the present invention, it is preferred to introduce 98 to 80 mol % of a monoazo yellow base pigment represented by the general formula (1), and a disazo yellow pigment represented by the general formula (2) containing a sulfonic acid group and/or a monoazo yellow pigment represented by the general formula (3) in an amount of 2 to 20 mol %, preferably 3 to 15 mol % to allow for the coexistence thereof. When the amount of the disazo yellow pigment and/or monoazo yellow pigment introduced is less than 2 mol %, the primary particle diameter of the pigment may be large, leading to insufficient improvement of the optical characteristics. To the contrary, when the amount is beyond 20 mol %, sharpness of the hue may be impaired, and the optical characteristics may be inhibited. Accordingly, the yellow pigment composition for image recording which is intended by the present invention is hardly obtained.

Although elevating transparency and tinctorial strength by reducing the primary particle diameter of a pigment leads to deteriorated light resistance in general, the resulting pigment of the present invention as described above exhibited extremely less reduction of light resistance, accompanied by no problem involving in image retaining capacity which is affected by light resistance, in comparison with any conventional untreated monoazo yellow pigment.

As a method for determining the presence of a fundamental aptitude of the yellow pigment described hereinabove as a coloring agent for image recording, any of the following methods can be adopted which have been conventionally known as general and simple methods. In brief, in instances where the yellow pigment composition for image recording is for use in a color toner, a master batch is first prepared including the pigment highly dispersed at a high concentration in a resin such as polyester, acryl or the like which is usually used as a binding resin. Next, a diluted dispersion of the aforementioned resin·pigment is prepared in a solvent such as tetrahydrofuran, ethyl acetate or the like, such that the pigment content of this master batch becomes 3 to 5% by weight. This dispersion is drawn down on a transparent film to produce a sample. This sample is placed on an over head projector (OHP), and the transmitted color is determined visually. In conjunction therewith, a spectral transmittance characteristic (Y value, transmittance) of the sample which is similarly produced is measured calorimetrically. Furthermore, for the determination of light resistance, color measurement is performed with the same calorimetric spectrophotometer after irradiation for a predetermined time period with a fadeometer. Moreover, shape and the like of the monoazo yellow pigment obtained with an electron microscope are also observed. Determination is made through taking into account of these results comprehensively.

Production of a color toner from the yellow pigment composition for image recording that is produced by the aforementioned procedure may be carried out according to the conventional process as described below. In brief, 55 to 75 parts by weight, preferably 60 to 65 parts by weight of a binding resin such as a linear polyester resin (ethylene oxide adduct of bisphenol A-terephthalic acid condensation product, softening point: 107° C., glass transition point: 63° C.), or a styrene acrylic resin (styrene/butyl methacrylate copolymer, softening point: 115° C., glass transition point: 63° C.) is placed into a kneader, heated and melted at 105 to 135° C., preferably 110 to 120° C., and thereto is gradually charged the yellow pigment of the present invention in an amount of 25 to 45 parts by weight, preferably 35 to 40 parts by weight to produce a master batch. Next, 7 to 20 parts by weight, preferably 10 to 15 parts by weight of this master batch is added to 80 to 93 parts by weight, preferably 85 to 90 parts by weight of the aforementioned binding resin such as a linear polyester resin, styrene acrylic resin or the like with an appropriate amount of charge adjusting agent to dilute, and melted and kneaded at 105 to 135° C., preferably 110 to 120° C. After cooling this mixture, powder obtained by grinding is classified to give the mean particle size of 5 to 12 μm. Further, a fluidity improving agent, a cleaning auxiliary agent and the like are added thereto to obtain a color toner.

Additionally, when the yellow pigment composition for image recording is for use in a water based ink jet system, a 20 to 30% water based dispersion of highly dispersed pigment at a high concentration is first produced using a resin such as an acryl based resin having dispersibility which is generally used. Then the mean particle size and viscosity of the pigment is measured. Next, a diluted dispersion of the aforementioned resin∩pigment is prepared in a solvent such as water/glycerin or the like such that the content of the pigment in this dispersion becomes 3 to 5% by weight. This dispersion is drawn down on a dedicated paper for an ink for use in a water based ink jet system to produce a sample.

Optical density [Optical Dencity=$\log_{10}$ (amount of incoming light/amount of outgoing light), hereinafter, referred to as OD value] of this sample is measured with a Macbeth densitometer. Furthermore, for the determination of light resistance of the same sample, color measurement is performed with the same colorimetric spectrophotometer after irradiation for a predetermined time period with a fadeometer. In addition to the results of mean particle size, viscosity, OD value and light resistance of these pigments, shape and the like of the monoazo yellow pigment obtained with an electron microscope are also observed. Determination is made through taking into account of these results comprehensively.

When an ink for use in a water based ink jet system is produced from the yellow pigment composition for image recording that is produced by the aforementioned procedure, a dispersant (surfactant or water soluble resin), a surface tension adjusting agent (surfactant), a water soluble organic solvent, an antiseptic agent, a pH adjusting agent, a rust preventive agent and the like, as known components, may be added as needed.

The dispersant which can be suitably used in a water based ink for use in an ink jet system in the instances as described above may be any one which is well known, and may be any one of anionic or nonionic surfactants which have been used as a dispersant of a pigment. For example, examples of the anionic active agent include fatty acid salts, alkyl sulfate ester salts, alkylaryl sulfonate salts, alkylnaphthalene sulfonate salts, dialkyl sulfonate salts, dialkyl sulfosuccinate salts, alkyldiaryl ether disulfonate salts, alkyl phosphate salts, polyoxyethylene alkyl ether sulfate salts, polyoxyethylene alkylaryl ether sulfate salts, naphthalene sulfonic acid formalin condensates, polyoxyethylene alkylphosphate ester salts, glycerol borate fatty acid esters, polyoxyethylene glycerol fatty acid esters. Examples of the nonionic active agent include polyoxyethylene alkyl ether, polyoxyethylene alkylaryl ether, polyoxyethylene oxypropylene block copolymer, sorbitan fatty acid esters, polyoxyethylene sorbitan fatty acid esters, polyoxyethylene sorbitol fatty acid esters, glycerin fatty acid esters, polyoxyethylene fatty acid ester polyoxyethylene alkylamines and the like.

These dispersants are used in the range of 0.3 to 40% by weight per total weight of the yellow ink.

Additionally, a water soluble resin having dispersibility may be also used as a dispersant which is suitable for a water based ink for use in an ink jet system of the present invention. The water soluble resin which is suitably used in the present invention is selected from those which do not cause deposition of the pigment and gelation at the operating temperature of the printer for an ink jet system or at room temperature after dissolved in the solvent once. Examples of the water soluble resin which can be used include e.g., acrylic resins, and specific examples thereof include styrene-acrylic acid copolymer, acrylic acid-acrylate ester copolymer, styrene-acrylic acid-acrylate ester copolymer, styrene-methacrylic acid copolymer, styrene-methacrylic acid-acrylate ester copolymer, styrene-α-methyl styrene-acrylic acid copolymer, styrene-α-methyl styrene-acrylic acid-acrylate ester copolymer, polyacrylic acid, polymethacrylic acid, salts of vinyl naphthalene-acrylic acid copolymer, salts of styrene-maleic acid copolymer, salts of styrene-maleic anhydride copolymer, salts of vinyl naphthalene-maleic acid copolymer and the like. In addition, any one of monomers such as acrylonitrile, vinyl acetate, acrylamide, vinyl chloride, vinylidene chloride, ethylene, hydroxyethyl acrylate and the like may be subjected to copolymerization. Moreover, these may be added alone or in combination of multiple substances. These dispersants are used in the range of 0.1 to 30% by weight, preferably 1 to 30% by weight per total weight of the yellow ink.

The surface tension adjusting agent which is suitably used in the present invention may be any of well known ones as long as they do not adversely influences on the prepared ink. As the surface tension adjusting agent, any one of anionic, cationic, nonionic surfactants can be used. Specifically, illustrative examples of the anionic surfactant include polyethylene glycol alkyl ether sulfate ester salts, higher alcohol sulfate salts, naphthalene sulfonic acid formalin condensates and the like. Illustrative examples of the cationic surfactant include poly 2-vinylpyridine derivatives, poly 4-vinylpyridine derivatives and the like. Illustrative examples of the nonionic surfactant include polyoxyethylene alkyl ether, polyoxyalkyl phenyl ether, polyoxyethylene alkyl ester, polyoxyethylene sorbitan monoalkyl ether, polyoxyethylene alkylamine and the like.

In order to adjust the physical property of the ink to fall within the desired value, and to prevent the ink from drying, water and the following water soluble organic solvent may be used as a mixture. Examples of the water soluble organic solvent include alkyl alcohols having 1 to 4 carbon atoms such as methyl alcohol, ethyl alcohol, n-propyl alcohol, isopropyl alcohol, n-butyl alcohol and sec-butyl alcohol; ketones or ketone alcohols such as acetone or acetone alcohol; ethers such as tetrahydrofuran and dioxane; polyhydric alcohols such as ethylene glycol, propylene glycol, diethylene glycol, triethylene glycol, polyethylene glycol, glycerin, diethylene glycol diethyl ether, diethylene glycol mono-n-butyl ether and the like, and ethers and acetates thereof; nitrogenous compounds such as N-methyl-2-pyrrolidone, 1,3-dimethyl imidazolinone, dimethylformamide, triethanol amine and the like. One, or two or more of these water soluble organic solvents can be used. Although the amount of the water soluble organic solvent for use is not particularly limited, it may be generally in the range of from 3 to 50% by weight per total weight of the yellow ink.

The antiseptic agent which can be used in the present invention may be any one of well known ones as long as they do not adversely influences on the prepared ink. Examples thereof include sodium dehydrosulfate, sodium sorbate, sodium 2-pyridinethiol-1-oxide, sodium benzoate, sodium pentachlorophenol, 1,2-benzisothiazoline-3-one and the like.

The pH adjusting agent which can be suitably used in the present invention may be any one of almost all agents which can control the pH to be a desired value without adverse influences on the prepared ink. Specific examples include lower alkanol amines, ammonium hydroxide and the like.

The rust preventive agent which is suitably used in the present invention may be any one of all well known ones as long as they do not adversely influences on the prepared ink. Examples thereof include acidic sulfite salts, sodium thiosulfate, ammonium thioglycolate, diisopropyl ammonium nitrite, trinitrate pentaerythritol, dicyclohexyl ammonium nitrite and the like.

Moreover, in order to impart a glaze on the printed matter, for example, any of low condensates of vinyl pyrrolidone, acrylic resins, styrene-maleic acid resins and the like can be used as needed.

Mediaum which can be used in dispersing the monoazo yellow pigment described above may be any one of pure water and general organic solvents. Illustrative examples thereof include methanol, ethanol, isopropanol, ethylene glycol, glycerin and the like.

According to the present invention, to execute a surface treatment by adding a fatty acid ester followed by a post treatment such as a heat treatment or the like, after the synthesis by a coupling reaction is preferred in light of the improvement of dispersiblity. The fatty acid ester herein refers to a condensate obtained by dehydrating condensation between acid and alcohol as described below. Examples of the acid include capric acid, lauric acid, myristic acid, palmitic acid, stearic acid, oleic acid, behenic acid, beef tallow fatty acid, maleic acid, methacrylic acid, 2-ethylhexanoic acid, phthalic acid, adipic acid, trimellitic acid and the like. On the other hand, examples of alcohol include methyl alcohol, isopropyl alcohol, n-butyl alcohol, isobutyl alcohol, n-octyl alcohol, 2-ethylhexyl alcohol, n-decyl alcohol, isodecyl alcohol, lauryl alcohol, isotridecyl alcohol, myristyl alcohol, cetyl alcohol, stearyl alcohol, oleyl alcohol, behenyl alcohol, octyldodecyl alcohol and the like.

EXAMPLES

The present invention is explained in more detail below with reference to Examples and Comparative Examples, however, the present invention is not limited thereto. Unless otherwise specified, % in the following Examples and Comparative Examples represent % by weight.

[Synthesis of Pigment]

Example 1

To a mixed solution of 700 g of water and 315 g of 35% hydrochloric acid (3.02 mol) were added 181.4 g of 4-nitro-2-methoxyaniline (1.08 mol) and 68.8 g of base A (0.12 mol):

Base A

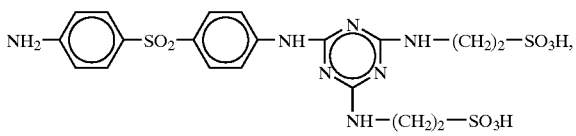

and stirred to allow for dispersion. After cooling this dispersion by adding about 600 g of ice, thereto was added a solution of 87 g of sodium nitrite (1.26 mol) dissolved in 100 g of water. The mixture was stirred for one hour while keeping the temperature of 10° C. or less, and excess nitrous acid was eliminated with sulfamic acid followed by filtration to give a diazotization liquid.

On the other hand, a coupling agent liquid was prepared as follows. After dissolving 100 g of sodium acetate (0.74 mol) in 8900 g of water, thereto was added 256.7 g of acetoacetyl-o-anisidide (1.24 mol) to allow for dispersion. Next, thereto was added and dissolved 185 g of 30% caustic alkali of sodium (1.39 mol). To thus resulting solution, 110 g of 80% acetic acid (1.47 mol) was added dropwise to adjust the pH of 6. Accordingly, a coupling agent liquid was obtained through adjusting the temperature of 25° C.

To this coupling agent liquid was added dropwise the diazotization liquid described above over 120 minutes to complete the coupling reaction. Next, the temperature was elevated to 90° C., and the mixture was subjected to a heat treatment for 30 min. Thereafter, by-product salts and the keeping the temperature of 10° C. or less, and excess nitrous acid was eliminated with sulfamic acid followed by filtration to give a diazotization liquid.

On the other hand, a coupling agent liquid was prepared as follows. After dissolving 100 g of sodium acetate (0.74 mol) in 8900 g of water, thereto was added 256.7 g of acetoacetyl-o-anisidide (1.24 mol) to allow for dispersion. Next, thereto was added and dissolved 185 g of 30% caustic alkali of sodium (1.39 mol). To thus resulting solution, 110 g of 80% acetic acid (1.47 mol) was added dropwise to adjust the pH of 6. Accordingly, a coupling agent liquid was obtained through adjusting the temperature of 25° C. To this coupling agent liquid was added dropwise the diazotization liquid described above over 120 minutes to complete the coupling reaction. Next, the temperature was elevated to 90° C., and the mixture was subjected to a heat treatment for 30 min. Thereafter, by-product salts and the like were removed by filtration and washing with water. Then the product was dried in a drying oven at 80° C. This dried pigment was subjected to grinding, and the yield of thus resulting yellow pigment composition was 477.8 g (1.16 mol), with the mean particle size of the pigment of 0.14 μm.

Example 3

A base pigment (I) for blending prepared as described below in an amount of 450 g and 50 g of the blending agent (I) described below:

Blending agent I

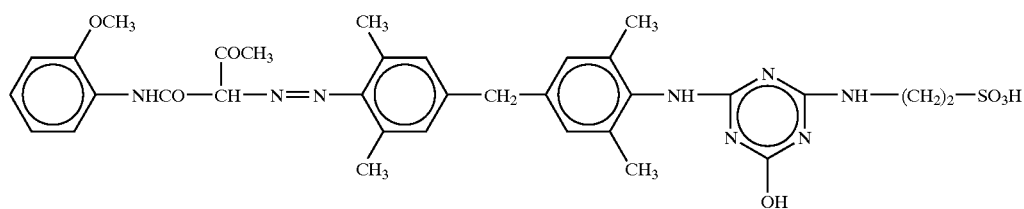

like were removed by filtration and washing with water. Then the product was dried in a drying oven at 80° C. This dried pigment was subjected to grinding, and the yield of thus resulting yellow pigment composition was 497.0 g (1.17 mol), with the mean particle size of the pigment of 0.08 μm.

Example 2

To a mixed solution of 700 g of water and 315 g of 35% hydrochloric acid (3.02 mol) were added 185.5 g of 4-nitro-2-methoxyaniline (1.10 mol) and 45.3 g of base B (0.10 mol):

Base B

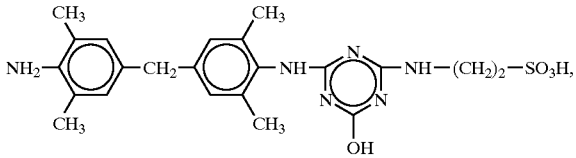

and stirred to allow for dispersion. After cooling this dispersion by adding about 600 g of ice, thereto was added a solution of 87 g of sodium nitrite (1.26 mol) dissolved in 100 g of water. The mixture was stirred for one hour while were blended in the form of powder to obtain a pigment composition of this Example having mean particle size of 0.16 μm with the ratio of the base pigment for blending/blending agent (I)=94/6 (mol %).

[Preparation of Base Pigment I for Blending]

To a mixed solution of 700 g of water and 315 g of 35% hydrochloric acid (3.02 mol) were added 197.6 g of 4-nitro-2-methoxyaniline (1.18 mol) and 8.9 g of 3,3'-dimethyl-4,4'-diaminobiphenyl-6,6'-disulfonic acid (0.02 mol), and stirred to allow for dispersion. After cooling this dispersion by adding about 600 g of ice, thereto was added a solution of 87 g of sodium nitrite (1.26 mol) dissolved in 100 g of water. The mixture was stirred for one hour while keeping the temperature of 10° C. or less, and excess nitrous acid was eliminated with sulfamic acid followed by filtration to give a diazotization liquid.

On the other hand, a coupling agent liquid was prepared as follows. After dissolving 100 g of sodium acetate (0.74 mol) in 8900 g of water, thereto was added 260.8 g of acetoacetyl-o-anisidide (1.26 mol) to allow for dispersion. Next, thereto was added and dissolved 185 g of 30% caustic alkali of sodium (1.39 mol). To thus resulting solution, 110 g of 80% acetic acid (1.47 mol) was added dropwise to adjust the pH of 6. Accordingly, a coupling agent liquid was obtained through adjusting the temperature of 25° C.

To this coupling agent liquid was added dropwise the diazotization liquid described above over 120 minutes to complete the coupling reaction. Next, the temperature was elevated to 90° C., and the mixture was subjected to a heat treatment for 30 min. Thereafter, by-product salts and the like were removed by filtration and washing with water. Then the product was dried in a drying oven at 80° C. This dried pigment was subjected to grinding to obtain the base pigment I for blending. The yield of thus resulting pigment was 447.2 g (1.15 mol).

[Preparation of Blending Agent (I)]

To a mixed solution of 180 g of water and 29.2 g of 35% hydrochloric acid (0.28 mol) was added 37.8 g of base B (0.08 mol), and stirred to allow for dispersion. After cooling this dispersion by adding about 200 g of ice, thereto was added a solution of 6.1 g of sodium nitrite (0.09 mol) dissolved in 30 g of water. The mixture was stirred for one hour while keeping the temperature of 10° C. or less, and excess nitrous acid was eliminated with sulfamic acid followed by filtration to give a diazotization liquid.

On the other hand, a coupling agent liquid was prepared as follows. To a solution prepared-by adding 38.0 g of 30% caustic alkali of sodium (0.29 mol) to 550 g of water was then added and dissolved 18.2 g of acetoacetyl-o-anisidide (0.09 mol). To thus resulting solution, 22.8 g of 80% acetic acid (0.30 mol) was added dropwise to adjust the pH of 6. Accordingly, a coupling agent liquid was obtained through adjusting the temperature of 25° C. To this coupling agent liquid was added dropwise the diazotization liquid described above over 40 minutes to complete the coupling reaction. Next, after elevating the temperature of this synthesis liquid to 70° C., aging was conducted for 60 min. Thereafter, by-product salts and the like were removed by filtration and washing with water. Then the product was dried in a drying oven at 80° C. This dried pigment was subjected to grinding to obtain the monoazo yellow pigment of the blending agent (I). The yield thereof was 56.0 g (0.08 mol).

Example 4

To a mixed solution of 700 g of water and 315 g of 35% hydrochloric acid (3.02 mol) was added 201.6 g of 4-nitro-2-methoxyaniline (1.20 mol), and stirred to allow for dispersion. After cooling this dispersion by adding about 600 g of ice, thereto was added a solution of 87 g of sodium nitrite (1.26 mol) dissolved in 100 g of water. The mixture was stirred for one hour while keeping the temperature of 10° C. or less, and excess nitrous acid was eliminated with sulfamic acid followed by filtration to give a diazotization liquid.

On the other hand, a coupling agent liquid was prepared as follows. After dissolving 100 g of sodium acetate (0.74 mol) in 8900 g of water, thereto was added 256.7 g of acetoacetyl-o-anisidide (1.24 mol) to allow for dispersion. Next, thereto was added and dissolved 185 g of 30% caustic alkali of sodium (1.39 mol). To thus resulting solution, 110 g of 80% acetic acid (1.47 mol) was added dropwise to adjust the pH of 6. Accordingly, a coupling agent liquid was obtained through adjusting the temperature of 25° C. To this coupling agent liquid was added dropwise the diazotization liquid described above over 120 minutes to complete the coupling reaction.

Next, 339.3 g of the pigment paste (pigment content: 36.6%) obtained from separately produced blending agent (I) prior to the drying which had been subjected to filtration and washing with water to remove the by-product salts was placed thereto. The temperature was elevated to 80° C., and the mixture was subjected to a heat treatment for 30 min. Thereafter, by-product salts and the like were removed by filtration and washing with water. Then the product was dried in a drying oven at 80° C. This dried pigment was subjected to grinding, and the yield of thus resulting yellow pigment composition was 621.0 g (1.06 mol). The pigment of the present invention was thus obtained having the mean particle size of the pigment of 0.15 μm, with the ratio of the base pigment for blending/blending agent (I)=88/12 (mol %).

Comparative Example 1

To a mixed solution of 700 g of water and 315 g of 35% hydrochloric acid (3.02 mol) was added 201.6 g of 4-nitro-2-methoxyaniline (1.20 mol), and stirred to allow for dispersion. After cooling this dispersion by adding about 600 g of ice, thereto was added a solution of 87 g of sodium nitrite (1.26 mol) dissolved in 100 g of water. The mixture was stirred for one hour while keeping the temperature of 10° C. or less, and excess nitrous acid was eliminated with sulfamic acid followed by filtration to give a diazotization liquid.

On the other hand, a coupling agent liquid was prepared as follows. After dissolving 100 g of sodium acetate (0.74 mol) in 4000 g of water, thereto was added 256.7 g of acetoacetyl-o-anisidide (1.24 mol) to allow for dispersion. Next, thereto was added and dissolved 185 g of 30% caustic alkali of sodium (1.39 mol). To thus resulting solution, 110 g of 80% acetic acid (1.47 mol) was added dropwise to adjust the pH of 6. Accordingly, a coupling agent liquid was obtained through adjusting the temperature of 25° C. To this coupling agent liquid was added dropwise the diazotization liquid described above over 120 minutes to complete the coupling reaction. Next, after stirring for 30 minutes, the pH was adjusted to 10 with an aqueous sodium hydroxide solution. The temperature was elevated to 90° C., and the mixture was subjected to aging for 30 min. Thereafter, by-product salts and the like were removed by filtration and washing with water. Then the product was dried in a drying oven at 100° C. This dried pigment was subjected to grinding, and the yield of thus resulting yellow pigment composition was 460.7 g (1.19 mol), with the mean particle size of the pigment of 0.45 μm.

Example 5

To a mixed solution of 1100 g of water and 375 g of 35% hydrochloric acid (3.596 mol) were added 171.8 g of 2-nitro-4-methyl-aniline (1.13 mol) and 48.4 g of 3,3'-dimethyl-4,4'-diaminobiphenyl-6,6'-disulfonic acid (0.13 mol), and stirred to allow for dispersion. After cooling this dispersion by adding about 700 g of ice, thereto was added a solution of 100 g of sodium nitrite (1.45 mol) dissolved in 130 g of water. The mixture was stirred for one hour while keeping the temperature of 10° C. or less, and excess nitrous acid was eliminated with sulfamic acid followed by filtration to give a diazotization liquid.

On the other hand, a coupling agent liquid was prepared as follows. After dissolving 110 g of sodium acetate (0.809 mol) in 7500 g of water, thereto was added 230.1 g of acetoacetyl anilide (1.30 mol) to allow for dispersion. Next, thereto was added and dissolved 173 g of 30% caustic alkali of sodium (1.30 mol). To thus resulting solution, 103 g of 80% acetic acid (1.373 mol) was added dropwise to adjust the pH of 6. Accordingly, a coupling agent liquid was obtained through adjusting the temperature of 25° C. To this coupling agent liquid was added dropwise the diazotization liquid described above over 120 minutes to complete the coupling reaction. Next, the temperature was elevated to 90° C., and the mixture was subjected to a heat treatment for 30 min. Thereafter, by-product salts and the like were removed by filtration and washing with water. Then the product was dried in a drying oven at 80° C. This dried pigment was subjected to grinding, and the yield of thus resulting yellow pigment composition was 465.5 g (1.22 mol), with the mean particle size of the pigment of 0.09 μm.

Example 6

To a mixed solution of 1100 g of water and 375 g of 35% hydrochloric acid (3.596 mol) were added 162.6 g of 2-nitro-4-methyl-aniline (1.07 mol) and 107.4 g of base C (0.19 mol):

Base C

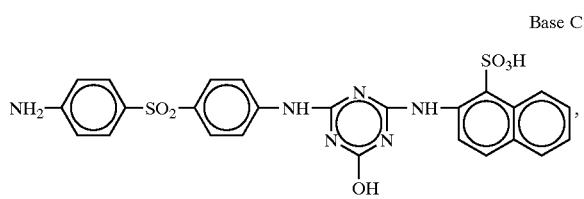

and stirred to allow for dispersion. After cooling this dispersion by adding about 700 g of ice, thereto was added a solution of 100 g of sodium nitrite (1.45 mol) dissolved in 130 g of water. The mixture was stirred for one hour while keeping the temperature of 10° C. or less, and excess nitrous acid was eliminated with sulfamic acid followed by filtration to give a diazotization liquid.

On the other hand, a coupling agent liquid was prepared as follows. After dissolving 110 g of sodium acetate (0.809 mol) in 5300 g of water, thereto was added 230.1 g of acetoacetyl anilide (1.30 mol) to allow for dispersion. Next, thereto was added 103 g of 80% acetic acid (1.373 mol) dropwise to adjust the pH of 6. Accordingly, a coupling agent liquid was obtained through adjusting the temperature of 25° C. To this coupling agent liquid was added dropwise the diazotization liquid described above over 120 minutes to complete the coupling reaction. Next, the temperature was elevated to 90° C., and the mixture was subjected to a heat treatment for 30 min. Thereafter, by-product salts and the like were removed by filtration and washing with water. Then the product was dried in a drying oven at 80° C. This dried pigment was subjected to grinding, and the yield of thus resulting yellow pigment composition was 487.0 g (1.22 mol), with the mean particle size of the pigment of 0.12 μm.

Comparative Example 2

To a mixed solution of 1100 g of water and 375 g of 35% hydrochloric acid (3.596 mol) was added 199.1 g of 2-nitro-4-methyl-aniline (1.31 mol), and stirred to allow for dispersion. After cooling this dispersion by adding about 700 g of ice, thereto was added a solution of 100 g of sodium nitrite (1.45 mol) dissolved in 130 g of water. The mixture was stirred for one hour while keeping the temperature of 10° C. or less, and excess nitrous acid was eliminated with sulfamic acid followed by filtration to give a diazotization liquid.

On the other hand, a coupling agent liquid was prepared as follows. After dissolving 110 g of sodium acetate (0.809 mol) in 5000 g of water, thereto was added 226.6 g of acetoacetyl anilide (1.28 mol) to allow for dispersion. Next, thereto was added and dissolved 173 g of 30% caustic alkali of sodium (1.30 mol). To thus resulting solution, 103 g of 80% acetic acid (1.373 mol) was then added dropwise to adjust the pH of 6. Accordingly, a coupling agent liquid was obtained through adjusting the temperature of 25° C. To this coupling agent liquid was added dropwise the diazotization liquid described above over 120 minutes to complete the coupling reaction. Next, the pH was adjusted to 10 with an aqueous sodium hydroxide solution. The temperature was elevated to 90° C., and the mixture was subjected to a heat treatment for 30 min. Thereafter, by-product salts and the like were removed by filtration and washing with water. Then the product was dried in a drying oven at 100° C. This dried pigment was subjected to grinding, and the yield of thus resulting yellow pigment composition was 427.8 g (1.26 mol), with the mean particle size of the pigment of 0.56 μm.

Example 7

A pigment of Comparative Examples 2 in an amount of 360 g and 140 g of the blending agent (II) described below:

Blending agent II

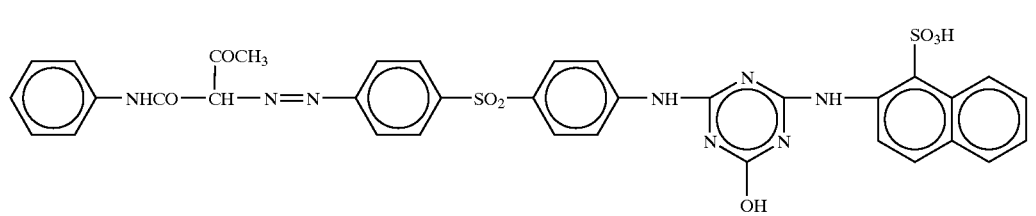

were blended in the form of powder to obtain a pigment composition of this Example having mean particle size of 0.18 μm with the ratio of the base pigment for blending/blending agent (II)=85/15 (mol %).

[Preparation of Blending Agent (II)]

To a mixed solution of 450 g of water and 84.5 g of 35% hydrochloric acid (0.81 mol) was added 114.4 g of base C (0.20 mol), and stirred to allow for dispersion. After cooling this dispersion by adding about 200 g of ice, thereto was added a solution of 16.8 g of sodium nitrite (0.24 mol) dissolved in 75 g of water. The mixture was stirred for one hour while keeping the temperature of 10° C. or less, and excess nitrous acid was eliminated with sulfamic acid followed by filtration to give a diazotization liquid.

On the other hand, a coupling agent liquid was prepared as follows. To a solution prepared by adding 100.0 g of 30% caustic alkali of sodium (0.75 mol) to 1500 g of water was added and dissolved 37.6 g of acetoacetyl anilide (0.21 mol). To thus resulting solution, 63.9 g of 80% acetic acid (0.85 mol) was added dropwise to adjust the pH of 6. Accordingly, a coupling agent liquid was obtained through adjusting the temperature of 25° C. To this coupling agent liquid was added dropwise the diazotization liquid described above over 40 minutes to complete the coupling reaction followed by stirring for 60 min. Next, after elevating the temperature of this synthesis liquid to 80° C., a heat treatment was conducted for 30 min. Thereafter, by-product salts and the like were removed by filtration and washing with water.

Then the product was dried in a drying oven at 80° C. This dried pigment was subjected to grinding to obtain the monoazo yellow pigment of the blending agent (II). The yield thereof was 142.5 g (0.19 mol).

Example 8

To a mixed solution of 600 g of water and 320 g of 35% hydrochloric acid (3.068 mol) were added 186.3 g of p-chloro-o-nitroaniline (1.08 mol) and 62.4 g of base D (0.12 mol):

Base D

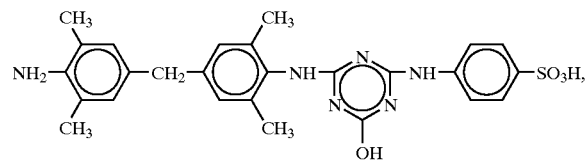

and stirred to allow for dispersion. After cooling this dispersion by adding about 600 g of ice, thereto was added a solution of 88 g of sodium nitrite (1.275 mol) dissolved in 100 g of water. The mixture was stirred for one hour while keeping the temperature of 10° C. or less, and excess nitrous acid was eliminated with sulfamic acid followed by filtration to give a diazotization liquid.

On the other hand, a coupling agent liquid was prepared as follows. To 9200 g of water was added 251.7 g of acetoacetyl-o-chloroanilide (1.19 mol) to allow for dispersion. Next, thereto was added and dissolved 180 g of 30% caustic alkali of sodium. To thus resulting solution, 160 g of 80% acetic acid (2.133 mol) was added dropwise to adjust the pH of 6. Accordingly, a coupling agent liquid was obtained through adjusting the temperature of 25° C.

To this coupling agent liquid was added dropwise the diazotization liquid described above over 120 minutes to complete the coupling reaction. Next, the temperature was elevated to 90° C., and the mixture was subjected to a heat treatment for 30 min. Thereafter, by-product salts and the like were removed by filtration and washing with water. Then the product was dried in a drying oven at 80° C. This dried pigment was subjected to grinding, and the yield of thus resulting yellow pigment composition was 307.0 g (1.15 mol), with the mean particle size of the pigment of 0.10 µm.

Comparative Example 3

To a mixed solution of 600 g of water and 320 g of 35% hydrochloric acid (3.068 mol) was added 207.0 g of p-chloro-o-nitroaniline (1.20 mol), and stirred to allow for dispersion. After cooling this dispersion by adding about 600 g of ice, thereto was added a solution of 88 g of sodium nitrite (1.275 mol) dissolved in 100 g of water. The mixture was stirred for one hour while keeping the temperature of 10° C. or less, and excess nitrous acid was eliminated with sulfamic acid followed by filtration to give a diazotization liquid.

On the other hand, a coupling agent liquid was prepared as follows. To 13100 g of water was added 247.5 g of acetoacetyl-o-chloroanilide (1.17 mol) to allow for dispersion. Next, thereto was added and dissolved 180 g of 30% caustic alkali of sodium. To thus resulting solution, 160 g of 80% acetic acid (2.133 mol) was added dropwise to adjust the pH of 6. Accordingly, a coupling agent liquid was obtained through adjusting the temperature of 25° C.

To this coupling agent liquid was added dropwise the diazotization liquid described above over 120 minutes to complete the coupling reaction. Next, after adjusting the pH to about 10 with a sodium hydroxide solution, the temperature was elevated to 90° C., and the mixture was subjected to a heat treatment for 30 min. Thereafter, by-product salts and the like were removed by filtration and washing with water. Then the product was dried in a drying oven at 100° C. This dried pigment was subjected to grinding, and the yield of thus resulting yellow pigment composition was 452.0 g (1.14 mol), with the mean particle size of the pigment of 0.38 µm.

Example 9

To a mixed solution of 600 g of water and 320 g of 35% hydrochloric acid (3.068 mol) was added 207.0 g of p-chloro-o-nitroaniline (1.20 mol), and stirred to allow for dispersion. After cooling this dispersion by adding about 600 g of ice, thereto was added a solution of 88 g of sodium nitrite (1.275 mol) dissolved in 100 g of water. The mixture was stirred for one hour while keeping the temperature of 10° C. or less, and excess nitrous acid was eliminated with sulfamic acid followed by filtration to give a diazotization liquid.

On the other hand, a coupling agent liquid was prepared as follows. To 13100 g of water was added 247.5 g of acetoacetyl-o-chloroanilide (1.17 mol) to allow for dispersion. Next, thereto was added and dissolved 180 g of 30% caustic alkali of sodium. To thus resulting solution, 160 g of 80% acetic acid (2.133 mol) was added dropwise to adjust the pH of 6. Accordingly, a coupling agent liquid was obtained through adjusting the temperature of 25° C.

To this coupling agent liquid was added dropwise the diazotization liquid described above over 120 minutes to complete the coupling reaction. Next, 258.7 g of the pigment paste (pigment content: 37.3%) of separately prepared blending agent (III) as described below:

Blending agent III

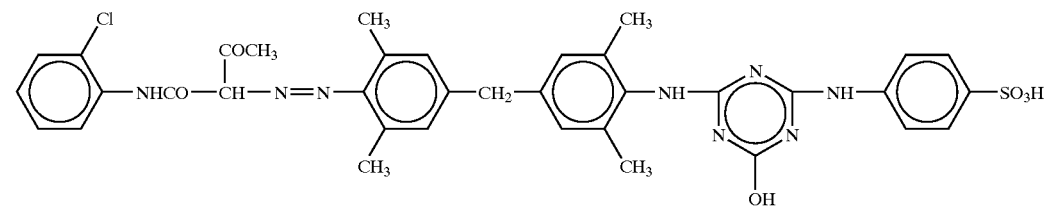

was placed thereto. The temperature was elevated to 80° C., and the mixture was subjected to a heat treatment for 30 minutes with mixing to obtain a base pigment for blending. Thereafter, by-product salts and the like were removed by filtration and washing with water. Then the product was dried in a drying oven at 80° C. This dried pigment was subjected to grinding, and the yield of thus resulting yellow pigment composition was 548.1 g (1.15 mol). The pigment of the present invention was thus obtained having the mean particle size of the pigment of 0.17 μm, with the ratio of the base pigment for blending/blending agent (III)=90/10 (mol %).

[Preparation of Pigment Paste of Blending Agent (III)]

To a mixed solution of 400 g of water and 58.4 g of 35% hydrochloric acid (0.56 mol) was added 83.2 g of base D (0.18 mol), and stirred to allow for dispersion. After cooling this dispersion by adding about 500 g of ice, thereto was added a solution of 12.2 g of sodium nitrite (0.18 mol) dissolved in 70 g of water. The mixture was stirred for one hour while keeping the temperature of 10° C. or less, and excess nitrous acid was eliminated with sulfamic acid followed by filtration to give a diazotization liquid.

On the other hand, a coupling agent liquid was prepared as follows. To a solution prepared by adding 76.0 g of 30% caustic alkali of sodium (0.57 mol) added to 1200 g of water was added and dissolved 38.0 g of acetoacetyl-o-chloroanilide (2.14 mol). To thus resulting solution, 45.6 g of 80% acetic acid (0.61 mol) was added dropwise to adjust the pH of 6. Accordingly, a coupling agent liquid was obtained through adjusting the temperature of 25° C. To this coupling agent liquid was added dropwise the diazotization liquid described above over 40 minutes to complete the coupling reaction followed by stirring for 60 min. Next, after elevating the temperature of this synthesis liquid to 80° C., a heat treatment was conducted for 30 min. Thereafter, by-product salts and the like were removed by filtration and washing with water. Then the product was dried in a drying oven at 80° C. This dried pigment was subjected to grinding to obtain the monoazo yellow pigment of the blending agent (III). The yield thereof was 116.4 g (0.16 mol).

Example 10

To a mixed solution of 600 g of water and 320 g of 35% hydrochloric acid (3.068 mol) was added 207.0 g of p-chloro-o-nitroaniline (1.20 mol), and stirred to allow for dispersion. After cooling this dispersion by adding about 600 g of ice, thereto was added a solution of 88 g of sodium nitrite (1.275 mol) dissolved in 100 g of water. The mixture was stirred for one hour while keeping the temperature of 10° C. or less, and excess nitrous acid was eliminated with sulfamic acid followed by filtration to give a diazotization liquid.

On the other hand, a coupling agent liquid was prepared as follows. To 13100 g of water was added 247.5 g of acetoacetyl-o-chloroanilide (1.17 mol) to allow for dispersion. Next, thereto was added and dissolved 180 g of 30% caustic alkali of sodium. To thus resulting solution, 160 g of 80% acetic acid (2.133 mol) was added dropwise to adjust the pH of 6. Accordingly, a coupling agent liquid was obtained through adjusting the temperature of 25° C.

To this coupling agent liquid was added dropwise the diazotization liquid described above over 120 minutes to complete the coupling reaction. Next, 444.1 g of the pigment paste (pigment content: 35.6%) of separately prepared blending agent (II) was placed thereto. The temperature was elevated to 80° C., and the mixture was subjected to a heat treatment for 30 minutes with mixing. Thereafter, by-product salts and the like were removed by filtration and washing with water. Then the product was dried in a drying oven at 80° C. This dried pigment was subjected to grinding, and the yield of thus resulting yellow pigment composition was 611.0 g (1.15 mol). The pigment of the present invention was thus obtained having the mean particle size of the pigment of 0.16 μm, with the ratio of the base pigment for blending/blending agent (II)=85/15 (mol %).

The pigments obtained as set forth above are described below with reference to color toners as examples of image recording.

[Production of Sample]

Using the monoazo yellow pigments of Examples 1 to 10 and Comparative Examples 1 to 3, samples for testing for the presence of fundamental aptitudes as a coloring agent for use in a color toner were produced according to the following procedure. First, 60 parts of a linear polyester resin (ethylene oxide adduct of bisphenol A-terephthalic acid condensation product, softening point: 107° C., glass transition point: 63° C.), as a binding resin, was placed into a kneader, heated and melted at 110 to 112° C., and thereto was gradually added the test pigment in an amount of 40 parts by weight to produce a master batch having the pigment content of 40%, according to a conventional process.

Next, 10 parts by weight of this master batch was dissolved in 90 parts by weight of a tetrahydrofuran solvent to prepare a yellow pigment dispersion having the pigment content of 4%, respectively. This pigment dispersion was drawn down on a transparent film and a white coated paper with a bar coater (0.15 mm). The drawn-down transparent film was for use as a sample in the measurement of optical characteristic values, whilst the drawn-down white coated paper was for use as a sample in the measurement of light resistance.

Comparative Example 4

A test sample was produced using a commercially available benzidine based disazo pigment, Pigment Yellow 1705 (manufactured by Sanyo Color Works, Ltd., P.Y-17), according to the same process as those described above for the pigments obtained in Examples 1 to 10 and Comparative Examples 1 to 3.

Comparative Example 5

A test sample was produced using a commercially available condensed azo pigment, Cromophtal Yellow 3G (manufactured by Ciba, P.Y-93), according to the same process as those described above for the pigments obtained in Examples 1 to 10 and Comparative Examples 1 to 3.

Comparative Example 6

A test sample was produced using a commercially available condensed azo pigment, Toner Yellow HG (manufactured by Clariant (Japan) K.K, P.Y-180), according to the same process as those described above for the pigments obtained in Examples 1 to 10 and Comparative Examples 1 to 3.

Tests were performed as described below on the samples of pigments, which were produced as described above.

[Test of Pigment]

(1) Optical Characteristic Values (a) Y value: Brightness (luminosity) of the sample was measured with a calorimetric spectrophotometer CM-3700d (manufactured by MINOLTA, (C light source, visual field: 2°)).

(b) Transmittance: Difference T (%) between transmittance at the wavelength of 550 nm and transmittance at the wavelength of 410 nm was measured with the same colorimetric spectrophotometer as that described in section (a).

(c) Color tone: The sample was placed on an over head projector (OHP), and the transmitted color is determined visually to evaluate according to the following bench marks.

A: Expressing a very brilliant yellow color, which can be used as a coloring agent for a color toner;

B: Expressing a brilliant yellow color, which can be used as a coloring agent for a color toner;

C: Expressing a slightly reddish yellow color with dull coloring, which may be used in practice without problem; and D: Expressing a light brown to dark brown color, which can not be used as a coloring agent for a color toner.

(2) Light Resistance

Irradiation was conducted with a fademeter (manufactured by Suga testing apparatus Co., Ltd., SC750-WN) for 100 hours, and color difference (ΔE) from the unirradiated sample was determined with the same calorimetric spectrophotometer as that described in section (1) (D65 light source, visual field: 10°). Greater ΔE indicates worse light resistance.

Results from the aforementioned tests are summarized in Table 1 below. From the columns for optical characteristic values in Table 1, it is clear that optical characteristics of the pigments of Example 1 to Example 10 are more markedly improved in comparison with those of corresponding Comparative Examples 1 to 3. In addition, also in comparison with the pigments of Comparative Examples 4 to 6 for the published market products, they exhibited equivalent or more favorable values, which result in satisfactory image reproducibility. Additionally, in connection with light resistance of the pigments of Examples 1 to 10, they exhibited greater ΔE value compared to those of corresponding Comparative Examples 1 to 3, however, extent of decrease in light resistance is small judging from the degree of the increase of the ΔE value. Therefore, it is found that satisfactory image retaining capacity is provided.

TABLE 1

|  | Optical characteristics | | | Light resistance (ΔE) |
| --- | --- | --- | --- | --- |
|  | Y value | Transmittance T % | Color tone |  |
| Example 1 | 81.9 | 84.8 | A | 19.6 |
| Example 2 | 80.4 | 78.8 | B | 17.6 |
| Example 3 | 78.9 | 82.0 | A | 16.0 |
| Example 4 | 79.5 | 78.3 | B | 16.8 |
| Example 5 | 81.1 | 84.6 | A | 19.0 |
| Example 6 | 81.0 | 81.8 | A | 18.3 |
| Example 7 | 77.0 | 77.6 | B | 17.2 |
| Example 8 | 81.0 | 81.8 | A | 18.3 |
| Example 9 | 77.2 | 77.8 | B | 19.3 |
| Example 10 | 79.1 | 78.0 | B | 16.5 |
| Comparative Example 1 | 67.0 | 50.6 | D | 14.4 |
| Comparative Example 2 | 68.6 | 55.7 | D | 14.7 |
| Comparative Example 3 | 68.1 | 64.4 | D | 14.8 |
| Comparative Example 4 | 82.5 | 83.4 | B | 53.5 |
| Comparative Example 5 | 81.3 | 76.8 | C | 5.8 |
| Comparative Example 6 | 78.2 | 77.6 | C | 10.6 |

Next, inks for use in an ink jet system (IJ) are exemplified below.

[Preparation of Pigment Dispersion, Test and Evaluation]

(Preparation of Pigment Dispersion)

A composition consisting of 20 parts of the pigment obtained in Examples 1 to 10 or Comparative Examples 1 to 3, or in Comparative Examples 4 to 6, 12.5 parts of an acrylic resin dispersant (manufactured by JOHNSON POLYMER CORPORATION, Johncryl 61J), 10 parts of ethylene glycol, 0.5 part of diethanolamine and 57 parts of pure water was placed in a sand mill, allowed for dispersion for 5 hours to prepare an ink for an IJ having the pigment content of 20%.

(Test and Evaluation Method of Pigment Dispersion)

<Pigment Particle Size>

With respect of the ink for an IJ having the pigment content of 20%, mean particle size (in nm) of the dispersion thereof was measured using a measuring device of particle size distribution by a light scattering method (manufactured by Otsuka Electronics Co.,Ltd., trade name: type LPA-3100).

<Viscosity>

Viscosity of the ink for an IJ having the pigment content of 20% was measured using an E type viscometer (manufactured by TOKIMEC INC., trade name: type ELD-60).

<OD Value>

After preparing a dispersion of the ink for an IJ having the pigment content of 20% by diluting in a solvent (water/glycerin=80/20) such that the pigment content became 4%, it was drawn down on a color paper for draw down (SEIKO-EPSON/Super fine MJA4SP1) with a 0.15 mm bar coater. OD value of this sample was measured with RD-19(I) type manufactured by Gretag Macbeth.

<Light Resistance>

Using the same sample as those for use in the measurement of the OD value, color difference (ΔE) was determined in a similar manner to that employed for the color toner. Greater ΔE indicates worse light resistance.

Results from the aforementioned tests are summarized in Table 2. From the columns for mean particle size of the dispersion and OD value which affect optical characteristic values in Table 2, it is clear that optical characteristics of the pigments of Example 1 to Example 10 are more markedly improved in comparison with those of corresponding Comparative Examples 1 to 3. In addition, also in comparison with the pigments of Comparative Examples 4 to 6 for the published market products, they exhibited equivalent or more favorable values, which result in satisfactory image reproducibility. Additionally, in connection with light resistance of the pigments of Examples 1 to 10, they exhibited greater ΔE value compared to those of corresponding Comparative Examples 1 to 3, however, extent of decrease in light resistance is small judging from the degree of the increase of the ΔE value. Therefore, it is found that satisfactory image retaining capacity is provided.

TABLE 2

|  | Viscosity (mPa · s) | Mean particle size of dispersion (nm) | OD value (—) | Light resistance (ΔE) |
| --- | --- | --- | --- | --- |
| Example 1 | 5.0 | 81 | 1.41 | 17.8 |
| Example 2 | 5.5 | 85 | 1.42 | 17.7 |
| Example 3 | 13.5 | 130 | 1.38 | 15.1 |
| Example 4 | 13.3 | 146 | 1.30 | 14.9 |
| Example 5 | 5.5 | 88 | 1.38 | 17.1 |
| Example 6 | 6.6 | 98 | 1.44 | 15.3 |
| Example 7 | 26.1 | 157 | 1.35 | 14.4 |
| Example 8 | 6.3 | 100 | 1.40 | 16.5 |
| Example 9 | 19.8 | 183 | 1.33 | 15.5 |
| Example 10 | 16.0 | 168 | 1.41 | 14.8 |
| Comparative Example 1 | 166.4 | 505 | 1.22 | 14.4 |
| Comparative | 270.7 | 680 | 1.18 | 13.0 |

TABLE 2-continued

|  | Viscosity (mPa · s) | Mean particle size of dispersion (nm) | OD value (-) | Light resistance (ΔE) |
|---|---|---|---|---|
| Example 2 Comparative Example 3 | 188.1 | 536 | 1.10 | 12.9 |
| Comparative Example 4 | 22.2 | 110 | 1.35 | 48.2 |
| Comparative Example 5 | 18.6 | 230 | 1.26 | 5.2 |
| Comparative Example 6 | 25.7 | 198 | 1.30 | 9.5 |

According to use of the yellow pigment composition for image recording of the present invention, a well-balanced yellow coloring agent for image recording can be obtained with favorable reproducibility of images and image retaining capacity, which is inexpensive and excellent in safety for a process of color image formation on the basis of electronic photographs, electrostatic printing processes and the like. Furthermore, according to the process for producing a yellow pigment composition for image recording of the present invention, a yellow pigment composition which is excellent in the aforementioned characteristics is provided.

What is claimed is:

1. A yellow pigment composition which comprises a monoazo yellow base pigment of formula (1), and a yellow pigment selected from the group consisting of a disazo yellow pigment of formula (2), a monoazo yellow pigment of formula (3), and a combination thereof:

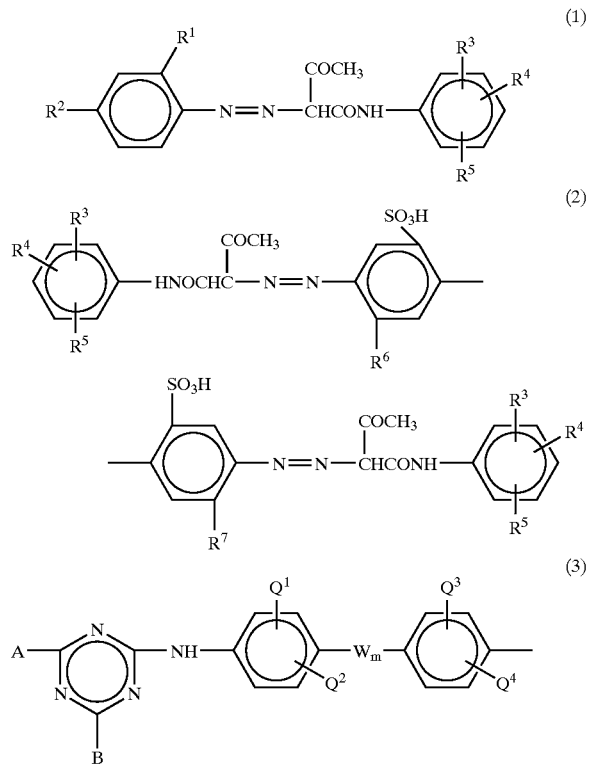

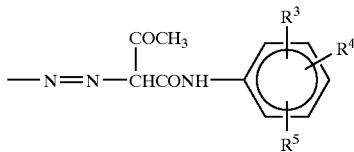

in the formulae (1) to (3), $R^1$ and $R^2$ represent a hydrogen atom, a chlorine atom, a nitro group, a methyl group or a methoxy group which are different with each other; $R^3$, $R^4$ and $R^5$ represent a hydrogen atom, a chlorine atom, a methyl group, a methoxy group or an ethoxy group which may be the same or different; $R^6$ and $R^7$ represent a methyl group or a methoxy group; $Q^1$ to $Q^4$ each independently is selected from the group consisting of a hydrogen atom, a lower alkyl group, a lower alkoxy group having 1 to 2 carbon atoms, and a hydroxyl group; W is a substituent selected from the group consisting of:

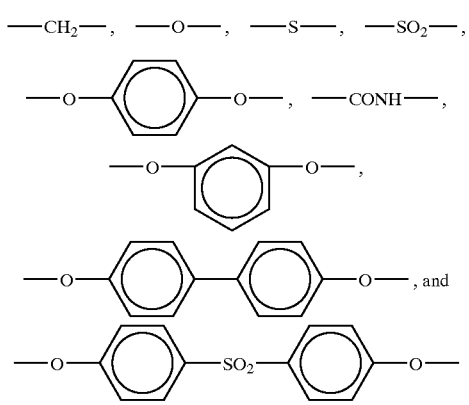

m represents an integer of 0 or 1; A and B each independently is —NH—Y—SO$_3$H or —OH, wherein Y is selected from the group consisting of an ethylene group, a phenylene group and a naphthylene group, which may include a substituent.

2. The yellow pigment composition according to claim 1, wherein the content of said monoazo yellow base pigment of formula (1) is 98 to 80 mol % and the total content of said disazo yellow pigment of formula (2) and/or said monoazo yellow pigment of formula (3) is 2 to 20 mol %.

3. The yellow pigment composition according to claim 1, wherein every one of a primary particle diameter of said monoazo yellow base pigment of formula (1), a primary particle diameter of said disazo yellow pigment of formula (2), and a primary particle diameter of said monoazo yellow pigment of formula (3) is in the range of from 0.15 to 0.2 μm.

4. A process for producing a yellow pigment, which comprises a coupling reaction of a base of formula (4), formula (5), or formula (6) and a coupling agent of formula (7), wherein the a monoazo yellow base pigment of formula (1) is produced by reacting the coupling agent of formula (7) and the base of formula (4);

a disazo yellow pigment of formula (2) is produced by reacting the coupling agent of formula (7) and the base of formula (5); and a monoazo yellow pigment of formula (3) is produced by reacting the coupling agent of formula (7) and the base of formula (6):

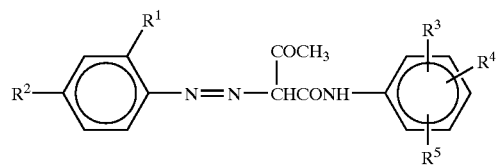
(1)

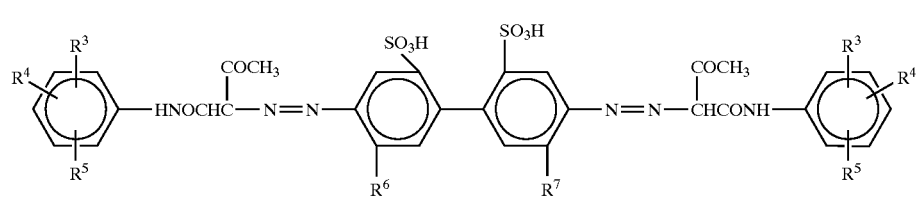
(2)

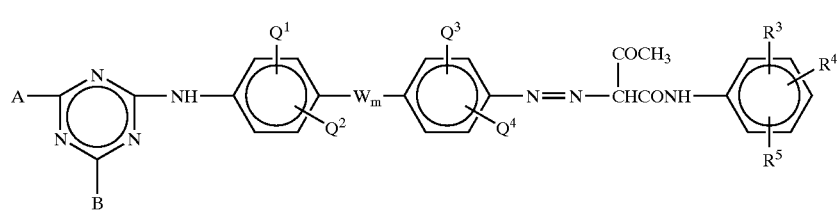
(3)

in the formulae (1) to (3), $R^1$ and $R^2$ represent a hydrogen atom, a chlorine atom, a nitro group, a methyl group or a methoxy group which are different with each other; $R^3$, $R^4$ and $R^5$ represent a hydrogen atom, a chlorine atom, a methyl group, a methoxy group or an ethoxy group which may be the same or different; $R^6$ and $R^7$ represent a methyl group or a methoxy group; $Q^1$ to $Q^4$ each independently is selected from the group consisting of hydrogen atom, a lower alkyl group, a lower alkoxy group having 1 to 2 carbon atoms, and a hydroxyl group; W is a substituent selected from the group consisting of:

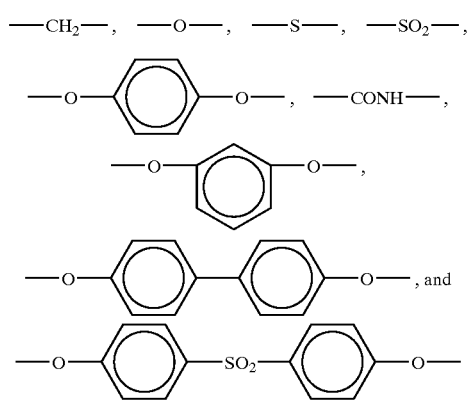

m represents an integer of 0 or 1; A and B each independently is —NH—Y—SO$_3$H or —OH, wherein Y is selected from the group consisting of an ethylene group, a phenylene group and a naohthylene group, which may include a substituent,

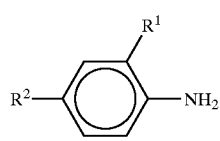
(4)

-continued

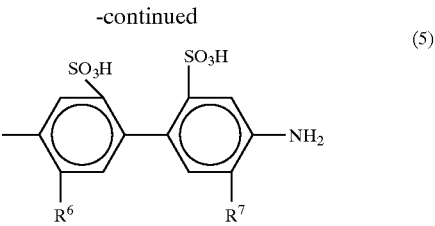
(5)

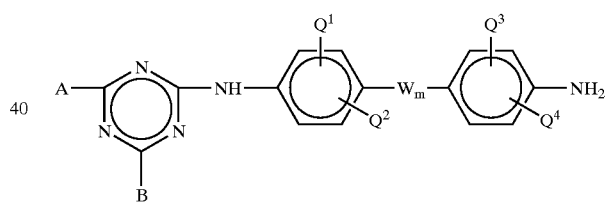
(6)

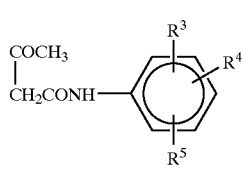
(7)

in the formulae (4) to (6), $R^1$ and $R^2$ are selected from the group consisting of a hydrogen atom, a chlorine atom, a nitro group, a methyl group and a methoxy group which are different from each other; $R^3$, $R^4$ and $R^5$ are selected from the group consisting of a hydrogen atom, a chlorine atom, a methyl group, a methoxy group and an ethoxy group which may be the same or different; $R^6$ and $R^7$ represent a methyl group or a methoxy group; $Q^1$ to $Q^4$ each independently are selected from the group consisting of a hydrogen atom, a lower alkyl group, a lower alkoxy group having 1 to 2 carbon atoms, and a hydroxyl group; W is a substituent selected from the group consisting of:

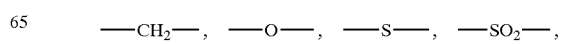

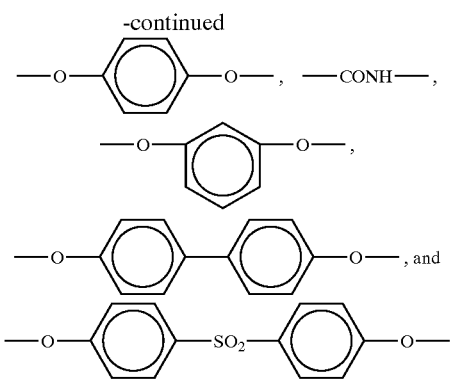

m represents an integer of 0 or 1, A and B each independently is —NH—Y—SO₃H or —OH, wherein Y is selected from the group consisting of an ethylene group, a phenylene group and a naphthylene group, which may include a substituent, 5. The process according to claim 4, further comprising preparing an image recording composition by blending the monoazo yellow base pigment of formula (1), with a yellow pigment selected from the group consisting of the disazo yellow pigment of formula (2), the monoazo yellow pigment of formula (3), and a combination thereof.

6. The process according to claim 5, wherein the image recording composition comprises the monoazo yellow base pigment of formula (1) in an amount of 98 to 80 mol %, and a yellow pigment selected from the group consisting of the disazo yellow pigment of formula (2), the monoazo yellow pigment of formula (3), and a combination thereof in an amount of 2 to 20 mol %.

7. A process according to claim 5 which comprises blending 98 to 80 mol % the monoazo yellow base pigment of formula (1), and 2 to 20 mol % of a yellow pigment selected from the group consisting of the disazo yellow pigment of formula (2), the monoazo yellow pigment of formula (3), and a combination thereof.

8. The yellow pigment composition according to claim 2, wherein every one of a primary particle diameter of said monoazo yellow base pigment of formula (1), a primary particle diameter of said disazo yellow pigment of formula (2), and a primary particle diameter of said monoazo yellow pigment of formula (3) is in the range of from 0.15 to 0.2 µm.

\* \* \* \* \*

UNITED STATES PATENT AND TRADEMARK OFFICE
CERTIFICATE OF CORRECTION

| | | |
|---|---|---|
| PATENT NO. | : 6,960,252 B2 | Page 1 of 1 |
| APPLICATION NO. | : 10/721402 | |
| DATED | : November 1, 2005 | |
| INVENTOR(S) | : Koichi Takahara et al. | |

It is certified that error appears in the above-identified patent and that said Letters Patent is hereby corrected as shown below:

ON TITLE PAGE
At page 1, item 75, "Kunji Kitamura, Hyoko" should be --Kunji Kitamura, Hyogo--.

Signed and Sealed this

Seventh Day of November, 2006

JON W. DUDAS
*Director of the United States Patent and Trademark Office*